United States Patent [19]
Chafetz et al.

[11] 3,789,076
[45] Jan. 29, 1974

[54] METHOD FOR TREATING NITROGEN-CONTAINING POLYMERIC DISPERSANTS

[75] Inventors: Harry Chafetz, Poughkeepsie; William P. Cullen, Fishkill; Edward F. Miller, Beacon, all of N.Y.

[73] Assignee: Texaco Inc., New York, N.Y.

[22] Filed: Nov. 12, 1971

[21] Appl. No.: 198,468

[52] U.S. Cl. ......... 260/583 N, 260/583 P, 260/132, 260/133, 260/135, 252/47
[51] Int. Cl............................................. C07g 17/00
[58] Field of Search.... 260/583 N, 583 P, 132, 133, 260/135

[56] References Cited
UNITED STATES PATENTS
3,459,664  8/1969  Anderson et al. .................... 252/47

Primary Examiner—Lewis Gotts
Assistant Examiner—D. R. Phillips
Attorney, Agent, or Firm—Thomas H. Whaley et al.

[57] ABSTRACT

Method for treating nitrogen-containing polymeric dispersants for mineral lubricating oil compositions comprising heating the dispersant at a temperature in the range from about 200° to 400°C to effect a decomposition of the unstable components present in the dispersant, extracting said reacted or decomposed unstable components with a lower aliphatic alcohol and recovering a dispersant of improved thermal stability.

11 Claims, No Drawings

METHOD FOR TREATING NITROGEN-CONTAINING POLYMERIC DISPERSANTS

BACKGROUND OF THE INVENTION

1. Field of the Invention

This invention is concerned with nitrogen-containing polymeric dispersant employed in lubricating oil compositions. Modern lubricating oil compositions for internal combustion engines contain a dispersant which functions to keep any impurities suspended in the lubricating oil so that they can be removed by the oil filter in the lubrication system.

In general, the dispersant is a nitrogen-containing polymeric material which has the ability to disperse and maintain in suspension any foreign insoluble material present in the lubricating oil.

The nitrogen-containing polymeric dispersants currently in use are highly effective against sludge and varnish formation under stop and go type driving conditions. The high temperature performance of these nitrogen-containing polymeric dispersants, however, is not satisfactory. In particular, many of the nitrogen-containing polymeric dispersants do not provide adequate protection against the formation of varnish at high temperatures, a deficiency which showed up when they were employed in a lubricating oil composition in diesel engine service. It has been postulated that this defect is due to the presence of thermally unstable compounds in the nitrogen-containing polymeric dispersant which at a high temperature cause or contribute to the formation of varnish in the engine.

2. DESCRIPTION OF THE PRIOR ART

No art is known which describes a method for treating nitrogen-containing polymeric dispersants for motor oils so as to improve their sludge and varnish resistant properties under high temperature engines operating conditions.

SUMMARY OF THE INVENTION

The method of the invention comprises treating a nitrogen-containing polymeric dispersant for a lubricating oil composition having unstable components by heating the dispersant at an effective temperature and for sufficient time to decompose said unstable components present in the dispersant and thereafter extracting the decomposed unstable components with a lower aliphatic alcohol.

More particularly, this method involves heating an oil-soluble nitrogen-containing polymeric lubricating oil dispersant, characterized by containing from about 0.5 to 6 percent nitrogen and by an average molecular weight ranging from about 500 to 50,000 at a temperature generally in the range of 200° to 400°C until substantially all of the thermally unstable components have been decomposed and solvent extracting the decomposed unstable components from the nitrogen-containing polymeric dispersant with an aliphatic alcohol having from 1 to 6 carbon atoms.

The method of this invention is relatively simple to conduct. In practice, the prescribed liquid nitrogen-containing polymeric dispersant is heated in a suitable vessel to a temperature generally ranging from about 200° to 400°C, preferably from 250° to 300°C, desirably with agitation or stirring of the mixture in order to insure even heat distribution and avoidance of hot spots. The elevated reaction temperature is maintained until a substantial portion or all of the unstable components in the dispersant have been decomposed. This will generally be evidenced by a loss of nitrogen from the dispersant and the nitrogen content of the dispersant can be monitored during the process as an indication of the completeness of the treatment. The decomposed unstable componenets must be removed or separated from the heat-treated reaction product. They are separated from the heat-treated dispersant by solvent extraction with an aliphatic alcohol. Specifically, aliphatic alcohols having from 1 to 6 carbon atoms such as methanol, ethanol, isopropanol, butanol and mixtures thereof are employed to extract the decomposed unstable components. The mechanism of the reaction is not fully understood, but it is postulated that the unstable components in the dispersant are decomposed during the heat treatment and are substantially removed from the dispersant in the above-noted extraction.

The duration of time for effecting the decomposition reaction is not critical. It will be understood that this time will be affected by the temperature and the amount of agitation employed and that the progress of the decomposition reaction can be monitored as noted above.

A variety of nitrogen-containing polymeric dispersants can be benefitted by the reaction of this invention. In general, the nitrogen-containing polymeric dispersants are oil-soluble mixtures of compounds formed from the reaction of a high molecular weight polymeric material and a nitrogen-containing compound, such as an amine or a polyamine. The nitrogen-containing polymeric dispersant reaction product is characterized by containing from about 0.5 to about 6 weight percent of nitrogen in the polymer and having a molecular weight averaging from about 500 to about 50,000. The most effective and preferred nitrogen-containing polymeric dispersants for employment in the process of the invention contain from about 1 to 3 percent nitrogen and have an average molecular weight ranging from about 700 to about 3000.

N-polyamine-substituted-alkenyl succinimides represent a class of nitrogen-containing polymeric dispersants which can be benefitted by the process of the invention. These materials can be prepared by reacting an alkenyl succinic acid anhydride having the formula:

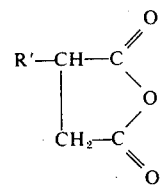

in which R' is a hydrocarbon radical having a molecular weight from about 400 to about 3000 with from one-half to two molar amounts of a polyamine having the formula:

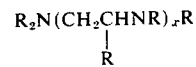

in which x is an integer from 1 to 6 and R is hydrogen or a low molecular weight alkyl radical.

R' in the first formula above represents a hydrocarbon radical preferably derived from the olefin containing from 2 to 5 carbon atoms. Suitable olefins from which R' is derived are ethylene, propylene, 1-butene isobutylene, 1-amylene, 2-amylene and the like. The R' radical generally has a molecular weight ranging from about 400 to 3000 corresponding to approximately 30 to 200 carbon atoms, with a preferred molecular weight being from about 800 to 1,500.

R in the polymaine represents hydrogen or a low molecular weight alkyl radical having from 1 to 3 carbon atoms, $x$ is an integer from 1 to about 6 and preferably from 2 to 5. Suitable polyamines or polyalkylene polyamines for preparing the reaction product are ethylene diamine, propylene diamine, butylene diamine, diethylene triamine, triethylene tetramine, tetraethylene pentamine, pentaethylene hexamine, dipropylene triamine, tripropylene tetramine, dimethylaminoethylamine, dimethylaminopropylamine and diethylaminopropylamine.

From one-half to two moles of the polyamine are reacted with one mole of the alkenyl succinic acid anhydride to form the reaction product. It is preferred to react approximately one mole of the alkenyl succinic acid anhydride with one mole of the polyamine. The reaction is normally effected at a temperature up to about 200°C. The preparation of this type reaction product is described in U.S. Pat. No. 3,131,150 and U.S. Pat. No. 3,172,892 and the disclosures of these patents are incorporated in the present application.

Another type of nitrogen-containing polymeric dispersant which can be improved by the present process are the oil-soluble polyalkylene polyamine derived dispersants. These nitrogenous dispersants can conveniently be prepared by reacting a halogenated polyolefin with a polyalkylene polyamine. In general, a halogen-containing polymer containing from 25 to 500 carbon atoms, such as the chlorinated polymer of propylene, ethylene-propylene, ethylene, butylene, is butylene and the like, is reacted with a polyalkylene polyamine such as ethylenediamine, 1,3-propanediamine, 1,6-hexanediamine, tetraethylenepentamine, pentaethylenehexamine, iminobispropylamine, N-aminoethylpiperazine and polyalkylene polyamines in general having a molecular weight from about 60 to 300. The resulting products are oil-soluble nitrogen-containing dispersants containing from about 0.5 to 6 percent nitrogen and having a molecular weight ranging from 1,200 to substantially above 50,000. The materials are more fully described in U.S. Pat. No. 3,275,554 and 3,565,804 wherein their use as lube oil additives is described. The disclosures of these references are incorporated in the present application.

The high temperature performance of nitrogen-containing polymeric dispersants derived from sulfurized polymers can be greatly improved by this method. These materials are prepared by reacting polymers having a molecular weight range of about 400 to 50,000 derived preferably from $C_2$–$C_5$ olefins, with sulfur at an elevated temperature in the range of 150° to 300°C and subsequent reaction with amines. These amines include polyalkylenepolyamines of the general formula:

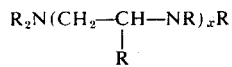

where R is a hydrogen or a low molecular weight alkyl radical having from 1 to 4 carbon atoms and $x$ is an integer from 1 to 6. Other suitable amines are 1,3-propanediamine, 1,4-butanediamine, 1,6-hexanediamine and the like as described in the sulphur-free materials referred to above. The sulphur-containing polymers will generally contain from about 0.5 to 5 percent sulphur. Polymers of the type described in U.S. Pat. No. 3,459,664 containing trithione polyamine reaction products are improved by the instant process.

EXAMPLE I 4,200 grams (3.0 moles) sulphurized polyisobutylene having the molecular weight of about 1,200 and containing 7.6 percent sulphur and 2,646 grams (14.0 moles) tetraethylene pentamine were heated at 200°C for 6 hours. The reaction mixture was diluted with heptane, extracted with a methyl alcohol-iso-propyl alcohol mixture and stripped under vaccuum to 100°C. The reaction product amounted to 3,800 grams and has the following analysis:

| | |
|---|---|
| % Nitrogen | 1.4 |
| % Sulphur | 3.8 |
| Total Base Number | 30.9 |

A portion of the above reaction product was heated to a temperature of 250°C for 20 hours with mechanical stirring and a nitrogen purge. This reaction mixture was then cooled, diluted with 30 percent mineral oil, diluted with heptane, extracted with a methyl alcohol-isopropyl alcohol mixture and stripped of alcohol under vacuum. Analysis of the heat-treated reaction product corrected for the oil present was as follows:

| | |
|---|---|
| % Nitrogen | 1.1 |
| % Sulphur | 3.8 |
| Total Base Number | 27.2 |

The effectiveness of the method of the invention was determined by employing both the heat-treated and untreated nitrogen-containing polymeric dispersants described above in a conventional crankcase lubricating oil composition at a concentration to provide a nitrogen content of about 0.07 percent and running these crankcase oils in a diesel engine test. Specifically, the lubricating oil compositions were employed in the Caterpillar 1–H diesel engine test. The crankcase lubricant in this test encounters relatively high engine temperatures which causes the formation of substantial amounts of varnish deposits on the piston of the engine. To pass the Caterpillar 1–H engine test, the lubricant must be effective against the formation of varnish on the piston skirts during the engine test.

Oil A is a conventional crankcase lubricant containing the untreated dispersant of Example I. Oil B is the same conventional crankcase lubricant containing the heat-treated and solvent-extracted dispersant of Examples I. The results obtained in the Caterpillar 1–H engine test tun are set forth in Table I below. The data shows the percentage of fill in the top groove (TGF) and the percentages of varnish covering in the first groove 1–G, first land 1–L, second groove 2–G, second land 2–L, third groove 3–G and the skirt area below the third groove.

TABLE I

| Test<br>Duration (Hrs) | | OIL A<br>120 | OIL B<br>120 |
|---|---|---|---|
| TGF-Carbon % | | 1 | 10 |
| 1-G % Varnish coverage | | 68 | 100 |
| 1-L % | " | 84 | 30 |
| 2-G % | " | 41 | 0 |
| 2-L % | " | 60 | 0 |
| 3-G % | " | 0 | 0 |
| Below 3-G | " | Varnish | Clean |

The above data show extensive varnish formation on the pistons resulting from the use of Oil A in the Caterpillar 1–H Engine Test. Oil B, containing the dispersant treated according to the process of the invention, prevented the formation of any varnish below the first land and demonstrates a surprising improvement due to the use of the heat-treated nitrogen-containing dispersant.

We claim:

1. A method for treating an oil-soluble nitrogen-containing sulfurized polymeric dispersant containing thermally unstable components which comprises heating said dispersant at a temperature in the range from about 200° to 400°C to react and decompose said thermally unstable components and extracting said decomposed thermally unstable components with an aliphatic alcohol having from 1 to 6 carbon atoms to recover a dispersant substantially free of thermally unstable components.

2. A method according to claim 1 in which said heating is conducted at a temperature from about 250° to 300°C.

3. A method according to claim 1 in which said nitrogen-containing polymeric dispersant is characterized by containing from about 0.5 to 6 percent nitrogen and having an average molecular weight ranging from about 500 to 50,000.

4. A method according to claim 1 in which said nitrogen-containing polymeric dispersant is characterized by containing from about 1 to 3 percent nitrogen and having an average molecular weight ranging from about 700 to 3,000.

5. A method according to claim 1 in which said nitrogen-containing polymeric dispersant has an average molecular weight from about 800 to 1,500.

6. A method according to claim 3 in which said dispersant is an N-polyamine-substituted alkenylsuccinimide.

7. A method according to claim 3 in which said dispersant is a polyolefin polyamine.

8. A method according to claim 7 in which said dispersant contains from about 0.5 to 5 percent combined sulphur.

9. A method according to claim 1 in which the extraction solvent for the decomposed unstable components is methyl alcohol.

10. A method according to claim 1 in which the extraction solvent for the decomposed unstable components is ethyl alcohol.

11. A method according to claim 1 in which the extraction solvent for the decomposed unstable components is a mixture of methanol and isopropanol.

* * * * *